United States Patent
Kim et al.

(10) Patent No.: US 7,550,521 B2
(45) Date of Patent: Jun. 23, 2009

(54) TOUGHENING OF THERMOSETS

(75) Inventors: Ho Sung Kim, New South Wales (AU); Nam Ho Kim, New South Wales (AU)

(73) Assignee: The University of Newcastle Research Associates Limited, New South Wales (AU)

( * ) Notice: Subject to any disclaimer, the term of this patent is extended or adjusted under 35 U.S.C. 154(b) by 294 days.

(21) Appl. No.: 10/519,251

(22) PCT Filed: Jun. 27, 2003

(86) PCT No.: PCT/AU03/00821

§ 371 (c)(1), (2), (4) Date: Dec. 22, 2004

(87) PCT Pub. No.: WO2004/003069

PCT Pub. Date: Jan. 8, 2004

(65) Prior Publication Data

US 2005/0234143 A1 Oct. 20, 2005

(30) Foreign Application Priority Data

Jun. 27, 2002 (AU) .................................. PS3238

(51) Int. Cl.
*C08L 63/00* (2006.01)
*C08J 9/00* (2006.01)
*C08J 7/00* (2006.01)
*B32B 27/38* (2006.01)

(52) U.S. Cl. ..................... 523/400; 521/50; 521/56; 521/60

(58) Field of Classification Search .............. 521/50, 521/56, 60; 523/400, 440
See application file for complete search history.

(56) References Cited

U.S. PATENT DOCUMENTS

| | | | |
|---|---|---|---|
| 4,751,249 A * | 6/1988 | Wycech | 521/54 |
| 4,923,902 A * | 5/1990 | Wycech | 521/54 |
| 5,385,778 A | 1/1995 | Deviney et al. | |
| 5,403,655 A | 4/1995 | Deviney et al. | |
| 5,470,886 A * | 11/1995 | Makhlouf et al. | 521/59 |
| 5,712,317 A | 1/1998 | Makhlouf et al. | |
| 6,403,222 B1 * | 6/2002 | Harrison | 428/418 |
| 6,451,876 B1 * | 9/2002 | Koshy | 523/219 |
| 7,047,633 B2 * | 5/2006 | Morganelli et al. | 29/832 |
| 2005/0027025 A1 * | 2/2005 | Erb et al. | 521/50 |

FOREIGN PATENT DOCUMENTS

| | | |
|---|---|---|
| JP | 01-249841 A1 * | 10/1989 |
| WO | WO 95/27000 | 10/1995 |
| WO | WO 02/24451 A1 | 3/2002 |
| WO | WO 02/31077 A2 | 4/2002 |

OTHER PUBLICATIONS

Abstract of JP 01-249841, provided by the JPO website (1989).*
Derwent Publications Ltd; Yokohama Rubber KK; Hydrocarbon foam as heat insulating material—comprising resin-bended hollow microspheres of both hydrocarbon and gloss material; YOKO 30/04/74-JA052387; 2 pages.
Derwent Publications Ltd; Yokohama Rubber KK; Hydrocarbon foam as heat insulating material—comprising resin-bended hollow microspheres of both hydrocarbon and gloss material; YOKO 30/04/74-JA052387; 2 pages, (1974).

* cited by examiner

*Primary Examiner*—Michael J Feely
(74) *Attorney, Agent, or Firm*—Woodard, Emhardt, Moriarty, McNett & Henry LLP

(57) ABSTRACT

A method of manufacturing thermosets such as epoxy resins includes adding expandable hollow microspheres, which expand with temperature as shown in the accompanying graph, to the base thermoset components in the liquid phase and applying heat treatment to the mixture so formed causing the microspheres to expand during or after curing of the thermoset. This results in a toughening mechanism caused by compressive residual stress around the microspheres which significantly increases the specific fracture energy of the epoxy resin.

7 Claims, 1 Drawing Sheet

TOUGHENING OF THERMOSETS

FIELD OF THE INVENTION

This invention relates to the toughening of thermosets and has been devised particularly though not solely for application to epoxy resins.

BACKGROUND OF THE INVENTION

Thermosets, such as epoxy resins, are brittle compared to thermoplastics because of their cross-linked molecular structures. Attempts have been made in the past to increase the toughness of thermosets, particularly epoxies, using the addition of liquid rubber or hard particles.

Liquid rubber has been successfully used as a toughening agent to increase the specific fracture energy. Its toughening mechanisms include bridging, cavitation, crack pinning, crack blunting etc. In addition to liquid rubber, other toughening agents such as hard particles, hard hollow microspheres and coreshell rubber have also been used.

Another development in this area is an attempt to toughen thermoplastics using a similar method to the one used for ceramics in which fracture toughness increase was achieved by a volume dilatation in the vicinity of crack tip resulted from tetragonal to monoclinic phase transformation.

The present invention results from the realisation that the pre-stressing of the epoxy matrix, and the creation of residual compressive stress may be performed using expandable hollow microspheres and heat treatment to achieve a similar effect to that of the phase transformation of ceramics.

SUMMARY OF THE INVENTION

Accordingly, the present invention provides a method of manufacturing a thermoset including the steps of adding expandable hollow microspheres to at least one of the base thermoset components, and applying heat treatment to the partially or fully cured thermoset, causing the expandable microspheres to expand during, or after, curing of the thermoset.

Preferably the thermoset comprises an epoxy resin and the expandable hollow microspheres are added to the epoxy component.

Preferably the mixture of epoxy component and expandable hollow microspheres are heated for easy mixing before adding a curing agent.

Preferably the mixture is allowed to cool before adding the curing agent.

Preferably the mixture is stirred after adding the curing agent, and poured into a mould for curing.

Preferably the expandable hollow microspheres consist of a co-polymer shell and gas.

Preferably the cured epoxy system is heated to create compressive residual stress around the expandable hollow microspheres.

BRIEF DESCRIPTION OF THE DRAWINGS

Notwithstanding any other forms that may fall within its scope, one preferred form of the invention will now be described by way of example only, with reference to the accompanying drawing which is a graph of the volume incremental expansion of expandable hollow microspheres due to heating.

DETAILED DESCRIPTION OF PREFERRED EMBODIMENTS OF THE INVENTION

Figure 1:
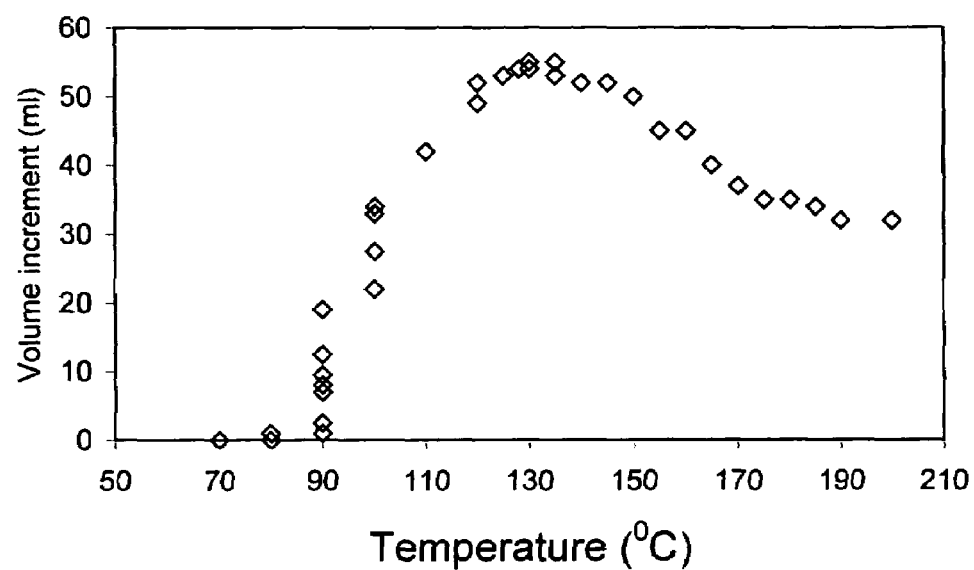

In the preferred form of the invention, a thermoset in the form of an epoxy resin is toughened by the addition of expandable hollow microspheres, but it will be appreciated that this method can be applied to any other form of thermoset material.

A conventional resin system such as the resin system consisted of West System Epoxy 105 (a blend of Bisphenol A and Bisphenol F) and West System Slow Hardener 206 (a blend of aliphatic amines and aliphatic amine adducts based on diethylene triamine and triethylenetetramine) as curing agent, has a typical density of 1.1 for the resin system.

The system can be modified by the addition of expandable hollow microspheres as demonstrated in the following example.

Modifier used was hollow microspheres (EXPANCEL, 551 DU40, Akzo Nobel) which consist of co-polymer shell and gas. The chemical structure of the microspheres was found to be $(C_5H_8O_2—C_3H_3N—C_2H_2Cl_2)_x$ using a Perkin Elmer Fourier Transform Infra Red Spectrometer, Paragon 1000. The microspheres expand when heated. By way of example, microspheres were put in a 100 ml measuring cylinder and tapped for 5 minutes and then placed in an oven pre-heated to 70° C. Further heating of the oven followed every 5 to 6 minutes for an increment of 10° C. until it reached 200° C. Resulting volume expansion of the microspheres measured as a function of temperature is shown in the accompanying diagram.

In a typical method of manufacture of toughened epoxy, a quantity of expandable hollow microspheres are added to the epoxy component and stirred for approximately ten minutes. The mixture is then heated to approximately 85° C. for thirty minutes to reduce the viscosity for easy stirring before being allowed to cool gradually e.g. in a water bath for about half an hour. The curing agent is then added and stirred for five minutes. The mixture can then be poured into a casting mould and left to cure at room temperature. Then, the moulded epoxy is heated at 135° C. for one hour and allowed to cool down to room temperature. Further additional two hour heating is followed at 135° C.

Comparative Testing

Four different types of specimens were prepared viz pure epoxy (PE), heated pure epoxy (HPE), micro-sphere modified epoxy without heat treatment (ME), and micro-sphere modified epoxy with heat treatment (MEH). The HPE was to check any change in properties of PE due to heating which was also applied to MEH. The ME was to be used in comparison with MEH for checking any heat treatment effect on MEH.

The mixing of epoxy and curing agent was conducted by stirring for five minutes. The stoichiometric amount of curing agent was 17 phr (by weight) for all specimens. The mixture was poured into an aluminium mould with 6 mm thick cavity and left for curing at room temperature at least for one day. Temperature rise in the mould due to exothermic reaction was monitored using a thermocouple and found to be about 8° C. which does not much effect the expansion of expandable hollow micro-spheres (see accompanying drawing).

For both ME and MEH, a 10 phr of 551 DU was added to epoxy and stirred for about 10 minutes. This mixture was heated to approximately 85° C. for 30 minutes to reduce the viscosity for easy stirring and then allowed to cool gradually in a water bath for about half-hour. The hardener was then added and stirred for 5 minutes. The casting was conducted in the same way as for PE and HPE.

The heat treatment was conducted for HPE and MEH. Both HPE and MEH was heated in an oven at 135° C. for one hour and then allowed to cool down to room temperature. Further two hour heating was conducted at the same temperature for 2 hours.

Results of the four different types of specimens for fracture toughness, flexural elastic modulus and flexural strength are listed in Table 1. Elastic modulus of PE appears to be not much affected by heat treatment and modification with hollow microspheres. Also its flexural strength appears to decrease due to modification without heat treatment but to a lesser extent when the modification is accompanied by the heat treatment. Fracture toughness, however, increases due to both modification and heat treatment. The increase of PE in fracture toughness after heating may be due to post-curing effect, although fracture surface features of HPE appeared to be different from that of PE.

Microscopic work was conducted to identify toughening mechanisms of ME and MEH. During preliminary observation of SEM images, some differences between MEH and ME were found. Some debonding between microspheres and matrix was found in ME, which is different from that of hollow latex particle with a styrene-acrylic shell, and some microspheres were pulled out. In contrast, MEH did not display any gaps between microspheres and matrix, and cracking passed through the microspheres without any pull-out of microspheres.

When MEH is heated, it is found that microspheres naturally expand against the matrix resulting in both matrix, and subsequently microspheres would permanently deform if deformation is sufficiently high. Consequently, residual compressive stresses around microspheres are created when cooled down. In order to confirm the residual compressive stress in the matrix, a thin section of MEH was examined and the residual stress was indeed found to exist around microspheres. The fringe patterns are observed around microspheres as evidence of the residual stress.

The effect of compressive stress in the vicinity of a crack tip is well known. In the case of ceramics toughening, the compressive stress is produced by localised volume dilation in the vicinity of crack caused by phase transformation. In the case of MEH, however, the compressive stress is distributed around microspheres throughout the whole specimen. Contribution of each microsphere to the toughness increase depends on its location—the closer to the crack tip, the more contribution.

Further to check if the residual stress in MEH is due solely to heat treatment, a thin section of ME was also examined and residual stress around microspheres was found as well. An epoxy shrinks during curing and thus it seems that the residual stress was caused by shrinkage in this case since it was not subjected to heat treatment. Accordingly, it appears that toughness increase in both ME and MEH were affected by the compressive residual stress. Quantification of the residual stress was not attempted, but the residual stress in MEH should be higher than in ME because the residual stress due to the epoxy shrinkage applies to both MEH and ME, and hence the residual stress in MEH would be the result of additional contribution of matrix shrinkage. Also, it had been observed using photo-elastic photos that there is generally much higher residual stress in MEH than in ME.

No gaps between microspheres and matrix in the vicinity of the crack tip were found in fast cracking regions for both ME and MEH. This suggests the gaps of ME are due to the cavitation when the crack slowly propagates. However, there were no gaps in MEH.

TABLE 1

Mechanical properties of epoxies prepared.

| Materials | $K_{1C}$ (MPa m$^{1/2}$) | $G_{1C}$ (kJ m$^{-2}$) | $\sigma_y$ (MPa) | E (GPa) |
| --- | --- | --- | --- | --- |
| PE | 0.65 | 0.30 | 130.65 | 1.42 |
| HPE | 0.98 | 0.64 | 131.04 | 1.50 |
| ME | 1.30 | 1.06 | 67.16 | 1.60 |
| MEH | 1.46 | 1.57 | 103.62 | 1.36 |

It has thus been found that epoxy resins toughened in this manner by the addition of expandable hollow microspheres and subsequently heated exhibit increased fracture toughness compared with simple epoxy resins of similar construction. It has been found that the heat treatment improves interfacial bonding between microspheres and the matrix. Compressive residual stress around microspheres, which may be responsible for the major toughening mechanism, is successfully created by expandable hollow microspheres with the heat treatment. It has also been found that specific fracture energy of epoxy can be increased about 13 times by this method.

The invention claimed is:

1. A method of manufacturing a thermoset including the sequential steps of:
   providing a curable mixture including a liquid base thermoset component, a curing agent and expandable hollow microspheres;
   allowing the curable mixture to cure, wherein a matrix forms around the expandable hollow microspheres and the expandable hollow microspheres essentially do not expand;
   heating the cured mixture so that the expandable hollow microspheres expand against the matrix causing permanent deformation in the matrix around the microspheres; and
   cooling the cured mixture such that compressive residual stress is created in the matrix around the microspheres.

2. A method as claimed in claim 1 wherein the mixture comprises an epoxy resin.

3. A method as claimed in claim 1 wherein said providing includes adding the curing agent to an initial mixture of the liquid base thermoset component and the expandable hollow microspheres.

4. A method as claimed in claim 3 wherein said initial mixture is heated before adding the curing agent.

5. A method as claimed in claim 4 wherein said heated initial mixture is allowed to cool before adding the curing agent.

6. A method as claimed in claim 1 further including the step of pouring the mixture into a mould.

7. A method as claimed in claim 1 wherein the expandable hollow microspheres comprise a co-polymer shell and gas.

* * * * *